C. SIMON.
SHOCK ABSORBING SUSPENSION FOR VEHICLES.
APPLICATION FILED NOV. 15, 1917.
1,318,018.
Patented Oct. 7, 1919.
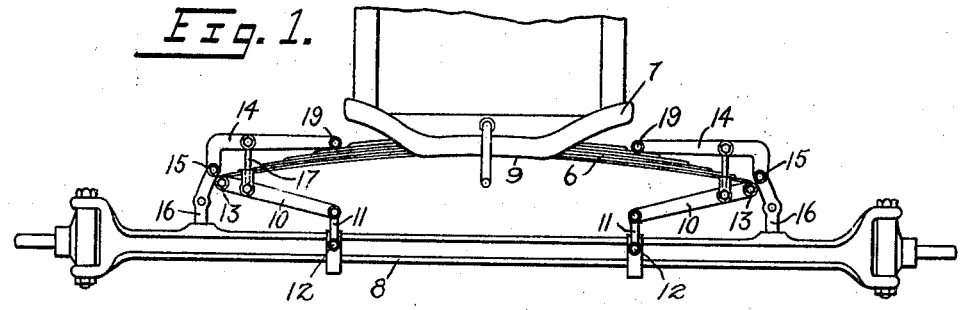
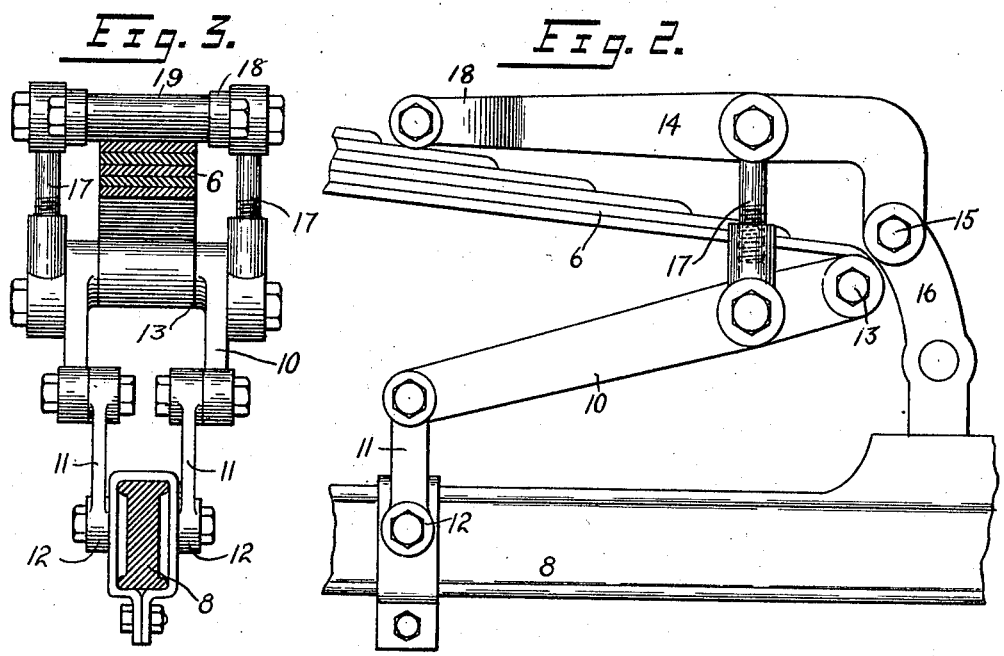
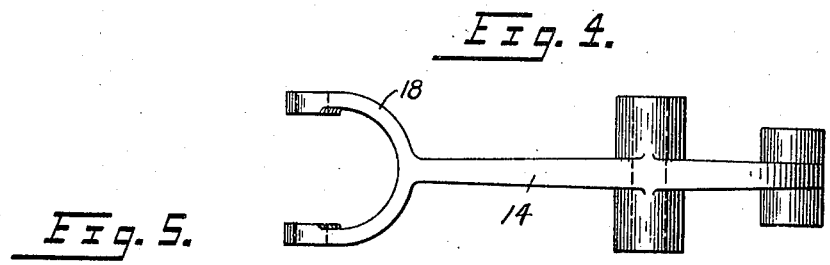
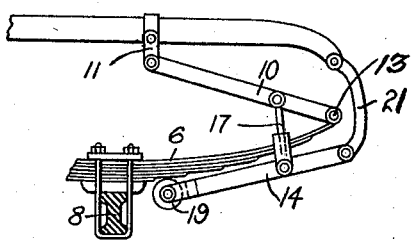
Inventor:
Charles Simon
By John O. Seifert
His Atty

UNITED STATES PATENT OFFICE.

CHARLES SIMON, OF NEWARK, NEW JERSEY.

SHOCK-ABSORBING SUSPENSION FOR VEHICLES.

1,318,018.          Specification of Letters Patent.      Patented Oct. 7, 1919.

Application filed November 15, 1917. Serial No. 202,100.

*To all whom it may concern:*

Be it known that I, CHARLES SIMON, a citizen of the United States, and a resident of Newark, in the county of Essex and State of New Jersey, have invented certain new and useful Improvements in Shock-Absorbing Suspensions for Vehicles, of which the following is a specification.

This invention relates to means embodying a spring or springs to suspend a vehicle frame from the running gear or axles of a vehicle and to absorb the shocks transmitted from the wheels to the vehicle body through the spring or springs in driving over uneven road surfaces and in encountering obstructions, and it is the object of the invention to provide means of this character in which the shocks are absorbed and the retractile or rebounding movements of the spring or springs of the suspension are retarded through the medium of interconnected levers.

It is another object of the invention to provide a device of this character which is applicable to the present various forms of spring suspensions and vehicles.

In the drawing accompanying and forming a part of this specification, Figure 1 is a front elevation of my improved vehicle suspension and shock absorbing device showing the same applied to a vehicle, only so much of the vehicle being shown as is essential to an understanding of the invention.

Fig. 2 is an enlarged detail to show the connection of the end of a spring to a wheel axle and the suspending of the vehicle from the axle.

Fig. 3 is an end elevation looking at the left of Fig. 2.

Fig. 4 is a plan view of one of the suspension levers; and

Fig. 5 is a front elevation showing a modified form of the application of my invention.

Similar characters of reference designate like parts throughout the different views of the drawing.

In Figs. 1 to 3 of the drawing I have shown an embodiment of my invention in which a spring 6 extends transversely of a frame 7, such as the chassis frame of a motor vehicle, and longitudinally of an axle 8 of the running gear and secured intermediate its ends, as at 9, to the frame. Two pairs of parallel levers 10, 10 extending in a plane below the spring are pivotally connected at one end by links 11, 11 to the axle 8, as at 12, and the other ends pivotally connected to the opposite ends of the spring, as at 13.

A lever 14 at each end of the spring and extending in a plane above the spring has an angle portion at one end whereby it is pivotally connected at 15 to supports 16 fixed to the axle 8. The levers 10 and 14 are interconnected by links 17 at a point intermediate their ends so that each of said levers will have a short end and a long end, the long end of the levers 10 being connected to the links 11 and the short ends to the ends of the spring 6. The short ends of the levers 14 have the angle portion connected to the supports 16, and the long end of such levers has a bifurcation 18 (Fig. 4) in which bifurcation is rotatably carried a roller 19 to bear upon the spring and operatively connect said levers and spring. The links 17 preferably consist of adjustably connected sections, such as a pair of sections one threaded into the other, as shown, to adapt the levers to different springs and compensate for variations in the springs.

In operation as the load is placed upon the spring through the frame, or a vehicle wheel encounters an obstruction, the tensioning of the spring will cause the short ends of the levers 10 to move downward with the ends of the springs. However, through the link connection 17 of the levers 10 and 14 the long ends of the levers 14 will also be moved downward causing the rollers 19 to bear upon the spring and relieving the ends of the spring of the stress of the load or shock, and the pressure of the roller upon the spring will prevent any sudden rebound of the spring.

In the modification shown in Fig. 5 the vehicle spring 6 extends transversely and is secured intermediate its ends upon the wheel axle instead of the chassis frame, the levers being connected at one end through the links with the frame and at the opposite end 13 with the spring. The levers 10 are interconnected with the lever 14 through the links 17, the levers 14 carrying the roller 19 at one end to bear upon the spring and the other end being connected to the frame by a link 21. While the spring 6 is secured to the axle with the levers 10 extending in a plane above and the lever 14 below the spring, and the latter lever is connected to the frame instead of the axle the operation of the device is the same as described in connection with Figs. 1 to 3.

Having thus described my invention, I claim:

1. In a vehicle the combination with the frame and running gear, of means to movably connect the frame and running gear to have movement relative to and away from each other, comprising a spring connected intermediate its ends to one of said parts, a lever pivotally connected at one end to the spring and at the other end to the running gear, and a second lever pivotally connected at one end to the running gear and arranged to frictionally engage the spring; and means to connect the levers at a point between their ends.

2. In a vehicle the combination with the frame and running gear, of a spring connected intermediate its ends to one of said parts, and two interconnected levers, one end of each lever being connected to the running gear with the other end of one lever connected to the spring and the other end of the other lever frictionally engaging the spring.

3. In a vehicle the combination with the frame and running gear, of a spring connected intermediate its ends to the frame, and two interconnected levers, each of said levers being connected to the running gear, and one of the levers connected to the spring and the other lever having a frictional engagement with the spring.

4. In a vehicle the combination with the frame and running gear, of a spring connected intermediate its ends to the frame; a pair of levers located at opposite ends of the spring, one end of each lever being pivotally connected to the running gear and the opposite end to the spring; and a second pair of levers one located at opposite ends of the spring and interconnected with the first levers, one end of each of said second pair of levers being pivotally connected to the running gear and the other end frictionally engaging the spring.

5. In a vehicle the combination with the frame and running gear, of a spring secured intermediate its ends to the frame; a pair of levers located at opposite ends of the spring, one end of each lever being pivotally connected to the running gear and the opposite end connected to the spring; and a second pair of levers located at opposite ends of the spring, one of which levers is interconnected with a lever of the first pair of levers and each lever pivotally connected at one end to the running gear and the other end frictionally engaging with the spring.

6. In a vehicle the combination with the frame and running gear, of a spring secured intermediate its ends to the frame; a pair of levers located at opposite ends of the spring, one end of each lever being pivotally connected to opposite ends of the springs; links to pivotally connect the opposite ends of the levers to the running gear; a second pair of levers located at opposite ends of the spring pivotally connected to the running gear; means to adjustably interconnect the levers; and a roller carried by the free end of the latter levers to engage with the spring.

7. In a vehicle the combination with the frame and running gear, of a spring connected intermediate its ends to the frame; a pair of levers located at opposite ends of the spring extending longitudinal of and in a plane below the spring, one end of each lever being pivotally connected to the opposite ends of the spring; links pivotally connecting the opposite ends of each of the levers to the running gear; a second pair of levers located at opposite ends of the spring extending in a plane above the spring and each lever pivotally connected at one end to the running gear; a roller carried at the opposite end of each of said second pair of levers to bear upon the spring; and means to adjustably interconnect one lever of one pair of levers with a lever of the other pair of levers.

Signed at New York, in the county of New York, and State of New York this 8th day of November, 1917.

CHARLES SIMON.

Copies of this patent may be obtained for five cents each, by addressing the "Commissioner of Patents, Washington, D. C."